United States Patent
Asbury et al.

(10) Patent No.: US 7,660,611 B1
(45) Date of Patent: Feb. 9, 2010

(54) WIRELESS HUMAN INTERFACE DEVICE PACKET COMPRESSION SYSTEM AND METHOD FOR REDUCING POWER CONSUMPTION

(75) Inventors: Raymond Charles Asbury, Eagle, ID (US); James Burton Cahoon, Boise, ID (US); Ryan Winfield Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 956 days.

(21) Appl. No.: 11/069,500

(22) Filed: Mar. 1, 2005

Related U.S. Application Data (60) Provisional application No. 60/556,241, filed on Mar. 25, 2004.

(51) Int. Cl.
*H04M 1/00* (2006.01)
(52) U.S. Cl. ............... 455/574; 455/41.2; 370/349; 370/466; 345/168
(58) Field of Classification Search ........... 370/318, 370/311, 349, 466; 455/574, 41.2
See application file for complete search history.

(56) References Cited

U.S. PATENT DOCUMENTS

| | | | |
|---|---|---|---|
| 6,311,228 B1 * | 10/2001 | Ray | 719/321 |
| 6,687,774 B2 * | 2/2004 | Milios et al. | 710/72 |
| 6,782,245 B1 * | 8/2004 | Lazzarotto et al. | 455/226.1 |
| 6,934,793 B2 * | 8/2005 | Ying et al. | 710/316 |
| 6,965,368 B1 * | 11/2005 | Andrews et al. | 345/156 |
| 7,061,910 B2 * | 6/2006 | Beshai | 370/392 |
| 7,127,546 B2 * | 10/2006 | Ying et al. | 710/316 |
| 7,167,934 B1 * | 1/2007 | Dunn et al. | 710/52 |
| 7,180,504 B2 * | 2/2007 | Nathan | 345/168 |
| 7,299,309 B2 * | 11/2007 | Ulenas | 710/67 |

(Continued)

OTHER PUBLICATIONS

Universal Serial Bus (USB), HID Usage Tables, Version 1.11, Jun. 2001, © 1996-2001 USB Implementers' Forum, pp. 15, 29, 30.

(Continued)

*Primary Examiner*—Sharad Rampuria (57) ABSTRACT

A method, system, and computer-readable storage medium are provided for compressing a packet of data sent across a wireless transmission path to reduce power consumption in a wireless input device. The wireless input device preferably includes a human interface device that sends a report that is of variable length and compressed by refraining from transmitting unused bytes of a packet containing the report. Certain byte fields can be swapped, such as a first scan code byte field with a modifier key byte. Also, any reserved bytes that are not used can be removed in order to convert a standard HID report format into the present compressed report format. By removing unused bytes and optimally swapping the more prevalently used byte into the first field while removing any reserved bytes, the compressed report reduces the amount of power consumed to transmit the compressed report, relative to a non-compressed and fixed-length report of conventional HID input devices. A report descriptor maintains the compresses format and provides that format, along with the compressed report, to the USB interface, for example, to recompile the standard report at the input port of, for example, a personal computer. The input device can be, for example, a keyboard and a pointing device. If a pointing device is used, the scroll wheel and button information can be combined into a single byte rather than utilizing two bytes as in conventional HID reports.

19 Claims, 7 Drawing Sheets

U.S. PATENT DOCUMENTS

| | | | |
|---|---|---|---|
| 7,310,498 B2 * | 12/2007 | Henry et al. | 455/41.2 |
| 7,436,300 B2 * | 10/2008 | Glass et al. | 340/568.1 |
| 2002/0151275 A1 * | 10/2002 | Trost et al. | 455/41 |
| 2002/0167932 A1 * | 11/2002 | McGowan | 370/349 |

OTHER PUBLICATIONS

Universal Serial Bus (USB), Device Class Definition for Human Interface Device (HID), Version 1.11, Jun. 2001, © 1996-2001 USB Implementers' Forum, pp. 4, 5, 9, 17, 26, 27, 55, 56, 61, 64.

* cited by examiner

| HEADER | REPORT TYPE | UPPER BYTE | LOWER BYTE | CHECKSUM |
|---|---|---|---|---|
| HDR | 0XFF (MM) | 0X00 | 0XE9 | CK |

54

| REPORT ID (I BYTE) | MM SCAN CODE (2 BYTES) | |
|---|---|---|
|  | MSB | LSB |
| 0X2 | 0X00 | 0XE9 |

56

| REPORT TYPE (SCAN CODE) | UPPER BYTE | LOWER BYTE |
|---|---|---|
| 0XFF (MM) | 0X00 | 0XE9 |

| HEADER | REPORT TYPE (SCAN CODE) | CHECKSUM |
|---|---|---|
| HDR | 0XFF (MM) | CK |

60

| REPORT ID (I BYTE) | MM SCAN CODE (2 BYTES) | |
|---|---|---|
|  | MSB | LSB |
| 0X2 | 0X00 | 0X00 |

| HEADER | REPORT TYPE (SCAN CODE) | INDEX | CHECKSUM |
|---|---|---|---|
| HDR | 0XFE (POWER/ SYSTEM CONTROL) | 0X1 | CK |

64

| REPORT ID (I BYTE) | INDEX (1 BYTE) |
|---|---|
| 0X3 | 0X01 |

66

| REPORT TYPE (SCAN CODE) | INDEX |
|---|---|
| 0XFE (POWER/ SYSTEM CONTROL) | 0X01 |

| HEADER | REPORT TYPE (SCAN CODE) | INDEX | CHECKSUM |
|---|---|---|---|
| HDR | 0XFE (POWER/ SYSTEM CONTROL) | 0X00 | CK |

70

| REPORT TYPE (SCAN CODE) | INDEX |
|---|---|
| 0XFE (POWER/ SYSTEM CONTROL) | 0X00 |

WIRELESS HUMAN INTERFACE DEVICE PACKET COMPRESSION SYSTEM AND METHOD FOR REDUCING POWER CONSUMPTION

PRIORITY APPLICATION

This application claims priority to provisional application No. 60/556,241 entitled "Wireless Human Interface Device (HID) Packet Compression," filed Mar. 25, 2004 and incorporated herein by reference.

BACKGROUND OF THE INVENTION

1. Field of the Invention

The present invention relates in general to electronic circuits and in particular to circuits used in wireless electronic input/output devices such as human interface devices (HIDs) that send and receive serial information into and from a computer using a compressed packet to reduce the consumption of power needed by a battery operated, wireless input/output device.

2. Description of the Related Art

The following descriptions and examples are not admitted to be prior art by virtue of their inclusion within this section.

A typical personal computer (PC) generally comprises a processing unit or microprocessor, memory, and input/output ports. A processing unit can have functional units that receive instructions from, for example, memory and operate on those instructions to produce results stored back into the memory, or dispatched to an input/output device connected to the port. There are many types of processors available on the market and are generally classified based on the instruction sets they are capable of handling. Memory can be defined generally as system memory or magnetic/optical mask storage memory. System memory is configured closer to the processing unit and is oftentimes referred to as semiconductor memory. The input/output port operates as a buffer and bus bridge to connect input/output devices to, for example, the system bus to which the processing unit is either directly or indirectly connected.

There are numerous types of input/output ports currently operative in the marketplace. For example, the input/output ports can be classified as either a serial port or a parallel port. If a PC includes a serial port, it is generally beneficial to communicate to the PC using a universal serial bus (USB). USB is a communication architecture that gives a PC the ability to interconnect with a variety of devices using a simple four-wire cable. USB has gained widespread acceptance where USB protocols can configure devices at startup for plug-and-play relative ease-of-use. When a USB peripheral is plugged into a USB port on a PC, the PC can auto-detect and auto-configure that peripheral device. In most cases, there is no user intervention required. The original USB specification has evolved over time to meet the needs of the industry, resulting in two versions available today. The USB interface can be described in various versions, all of which are available through the Internet at www.usb.org.

The USB devices that can be configured at startup or at runtime can be broken into various device classes, for example. Each device class defines a common behavior and protocols for those devices. A popular USB device class includes the human interface device (HID) class. As defined herein, the HID class consists primarily of devices (referred to herein as HID devices or simply devices) that are used by humans to control the operation of a computer system, such as a PC. Typical examples of HID class devices include: keyboards and pointing devices, front-panel controls, controls that might be found on devices such as telephones, VCR remote controls, games or simulation devices, and devices that may not require human interaction but provide data in a similar format to HID class devices (e.g., barcode readers, thermometers, or volt meters). A description of all of the various examples of HID class devices is provided in the usb.org website, under the definition of device class for HIDs and HID usage tables.

The USB protocol defines the structure by which HID devices send and receive data. For example, HID devices transmit and receive data in data packages called "reports." Reports contain two different types of data generated by HID devices: buttons and values. While the various types of data are generally classified as "data items," each data item is generated by a control, such as a key, slider, single access of a joystick, button, knob, switch, etc. While a button-type data item is binary (i.e., either the button is depressed or not), a value-type data item can have a range of values, usually indicating the position of a pointer device as opposed to, for example, whether a button on that pointer device has been depressed. While HID devices usually generate input data items, reports can also be received by HID devices. The reception of reports by an HID device can, for example, enable the PC to control an LED, speaker volume, or other output devices on an HID device.

Each control has an associated "usage" specified by the HID device manufacturer or, alternatively, programmed into the HID device during plug-and-play or startup. When the HID device is being auto-detected and auto-configured, the HID device can receive from a client (or host) an HID "report descriptor." A report descriptor will specify the reports generated by the HID device. Thus, for each report, the report descriptor describes the arrangement and formatting of the data items contained in the report, as well as the usages associated with each data item. Thus, the report can be represented as a set of bytes within a packet, each byte arranged and formatted according to the report descriptor to define certain usages for those bytes. Accordingly, one or more bytes within the report represents a data item usable by the PC. Any application program that uses HID report data must first parse the associated report descriptor to determine how to interpret the individual reports, and how to find the data items within the reports.

Typical USB HID reports from a keyboard are arranged and formatted by the report descriptor as having a fixed-length, 8-byte sequence of bits placed within a packet sent from the HID keyboard to the PC. The HID keyboard packet can allow possibly up to six simultaneous key presses, presses on a modifier key (e.g., a control, shift, alt key, etc.), and also contain a reserve byte to thereby represent all 8 bytes of the report. A conventional HID boot protocol keyboard packet is a fixed-length 8-byte packet, whereas a conventional HID mouse packet is a fixed-length 4-byte packet.

Difficulties arise, however, when attempting to send all fields of fixed-length keyboard and mouse packets across a wireless medium. For example, there may be several byte fields within the HID report that will be transmitted, even though many of those fields are not used in a typical packet. For example, a typical keyboard most likely encounters only a single key press, even though the HID keyboard report will transmit up to six simultaneous fields allocated for six simultaneous key presses. Requiring a wireless keyboard to transmit the entire 8-byte report, even though there is only a single byte of data in the report, significantly impacts the battery-life of the wireless keyboard. The typical mouse usage is movement only. Thus, the report should contains X and Y deltas, and not the unused Z delta (scroll wheel) or button presses. Therefore, the 4-byte mouse report should only contain two bytes of data since, in most instances, the only prevalent usage is the movement in the X and Y delta directions. Requiring the mouse to transmit the entire 4-byte report even though no button(s) are being actuated, nor is the scroll wheel being moved, significantly impacts the battery-life of the wireless mouse.

It would be desirable to have a system and method for compressing an HID report into only those bytes currently implemented by the HID device, and to discard and not transmit all bytes of the report that are not being implemented. In addition, it would also be desirable to arrange the fields within the report so that the type of report being conveyed can be determined as quickly as possible and, preferably, within one byte of the report. Instead of sending non-used reserve bytes or bytes reserved for concurrent key actuation or modified key actuation, it would be of benefit to simply not send such bytes in order to formulate a variable-size and relatively small size, compressed packet that consumes lessened energy for transmission thereof.

SUMMARY OF THE INVENTION

The problems outlined above are in large part solved by an improved system, method, and architecture for packet compression in a wireless communication system. The wireless communication system can, according to one embodiment, be an HID device that sends an HID report across a wireless medium to a serial port that is preferably a USB serial port. The improved system and method are used to reduce the amount of data that will be transmitted over the wireless medium from the wireless HID device. Since the present HID device is preferably not tethered and is preferably battery-powered, the HID device is power-sensitive. Reducing the amount of data that must be transmitted will thereby increase the battery life of the HID device. The improved method, system, and architecture hereof uses variable-length packets that rearranges the report format from the standard fixed-length USB HID boot protocol report formats.

According to one embodiment, the method includes removing any bytes from a packet that are not used by a destination device targeted to receive the packet. Alternatively speaking, any bytes not used by a destination device are typically bytes having a 0 decimal value and are not bytes generated by a control (e.g., generated by actuating the input, wireless device). The method also includes removing any reserved bytes from the packet and, possibly, swapping a byte within one field of the packet with a byte within another field of the packet before forwarding the packet from the wireless device.

The bytes removed from the packet are those reserved for certain control functions, such as the depression of a button or key on the wireless device. While the removed bytes are reserved for possibly other keys or buttons, if only one button or key is depressed, the remaining reserved bytes will not be used and, thus, are removed to formulate the reduced-size, variable-length, compressed packet. According to one example, the wireless device can be an input device and the destination device is a computer. The input device can transmit to the computer a sequence of the bytes within the packet as data items within an HID report. The bytes can represent scan codes stored in the device that uniquely represent a human actuation of a control. If a byte field is reserved for a particular control and that control is not present, then the reserved byte will not be sent. In other words, all unused or reserved bytes are thereby removed from the packet before it is transmitted, to form a compressed, reduced size, variable-length packet or report within a packet.

After the compressed, variable-length packet is transmitted across the wireless medium, the report can be reordered and logic 0 values added back to form byte fields and byte values at the PC interface. By reversing the compression process and essentially decompressing the packet, certain fields reserved for various data items can then be present in their recognizable order on the PC interface if the PC interface expects the data items in a certain report descriptor order, for example.

According to another embodiment, a system is provided for compressing a packet of data. The system includes an input device configured to produce an HID report within the packet. A device driver is coupled to receive the HID report, reorder the ordered sequence of bytes, and remove bytes within the ordered sequence of bytes that are not generated by user-actuation of the input device. A wireless medium can then receive the compressed packet of data that is then forwarded to the destination device.

The compressed packet of data may comprise a first byte within the reordered plurality of scan code bytes having a value indicating whether a keyboard key, multimedia key, power key, or a battery status is actuated upon the input device. That value of the first byte can be less than, for example, hexadecimal 0xFC to indicate a keyboard is actuated. The first byte is no larger than 8 bits. Following the first byte is a second byte having a second value indicating a multimedia, power, or battery status. There may also be a single byte having a value indicating whether a previous user-actuation upon the input device is kept alive and, thus, ensuring that the previous key will be repeated until an up-key report is generated or, for example, communication is lost between the input device and the PC.

According to yet another embodiment, a computer-readable storage medium is provided. The storage medium includes instructions that define a sequence of call routines. The call routines can be used to extract an HID report containing a predefined sequence of bytes within a packet of data, and remove any bytes within the packet of data having a 0 decimal value whenever an input device is user-actuated. The call routines can also extract a single byte having a value indicating all subsequent bytes within the packet of data have a 0 decimal value whenever the input device is user-deactuated. A further call routine can be used to extract a first byte having a type value indicating whether a keyboard key, multimedia key, power key, or battery status is user-actuated. The call routine can yet further extract a second byte and place the second byte immediately subsequent to the first byte, and having a status value indicating a multimedia status, power status, or battery status.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
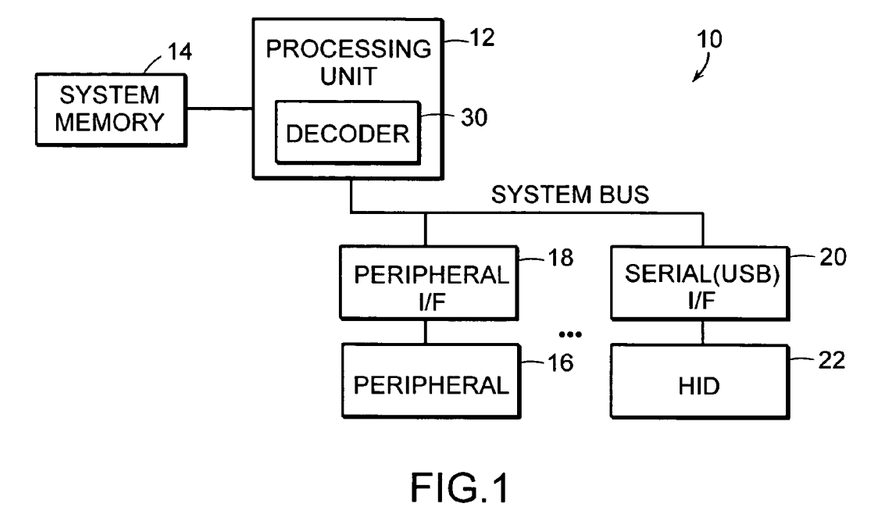
FIG. 1 is a block diagram of a computer system having a serial interface port connected to a HID for sending HID-derived data items to and from the computer.

Turning now to the drawings, FIG. 1 illustrates a computer system 10. System 10 includes a processing unit 12 and system memory 14. System memory, such as semiconductor memory that includes ROM and RAM, stores data and program instructions. Instructions include routines, programs, objects, components, interfaces, interface functions, etc. When executed by processing unit 12, these modules perform tasks, implement particular abstract data types, and expose or implement various interfaces and interface functions.

Computer system 10 can be stand-alone or connected to a network through a network interface card, and can be either desktop or portable devices, mini computers, mainframe computers, and the like. The program modules and the tasks implemented by such modules can be practices in distributed computer environments, with possibly numerous processing units 12 distributed across a network or by a single system bus to form a local and remote distributed system with local and remote memory storage devices. Coupled to processing unit 12 is a system bus. The system bus may be of any of the several types of bus structures known in PC architecture. A popular system bus includes PCI, EISA, ISA, and numerous others that subsume the nomenclature of local bus, mezzanine bus, and peripheral bus.

Coupled to the system bus are various peripheral devices 16. For example, a peripheral device may be a hard disk drive, magnetic disk drive, or CD-ROM, and can also include a network interface card that connects to another local area network of a remote computer. Thus, peripheral device 16 is generally referred to as any input/output device that can communicate data to and from processing unit 12 or system memory 14. In order to effectuate the communication, a peripheral interface 18 can be used to bridge the different communication protocols between the peripheral and the system bus. Oftentimes, the peripheral interface or port can be referred to as a bus bridge or simply a bus interface unit.

In the example shown, there may be numerous types of peripheral interfaces or ports. For example, one port might be a serial port. More specifically, the serial port might be a USB port that might bridge the protocol sent within a USB and the protocol of the system bus. As shown, the USB port 20 thereby allows communication between a USB device and, particularly, a USB HID device 22 and the system bus. HID device 22 includes any device which can send or receive HID reports. Popular such HID devices include a keyboard or pointing device (such as a mouse). Other HID devices envisioned are microphones, joysticks, game pad, satellite dish, scanner, simulation control devices, stick devices, telephony devices, digitizer devices, etc.

Figure 2:
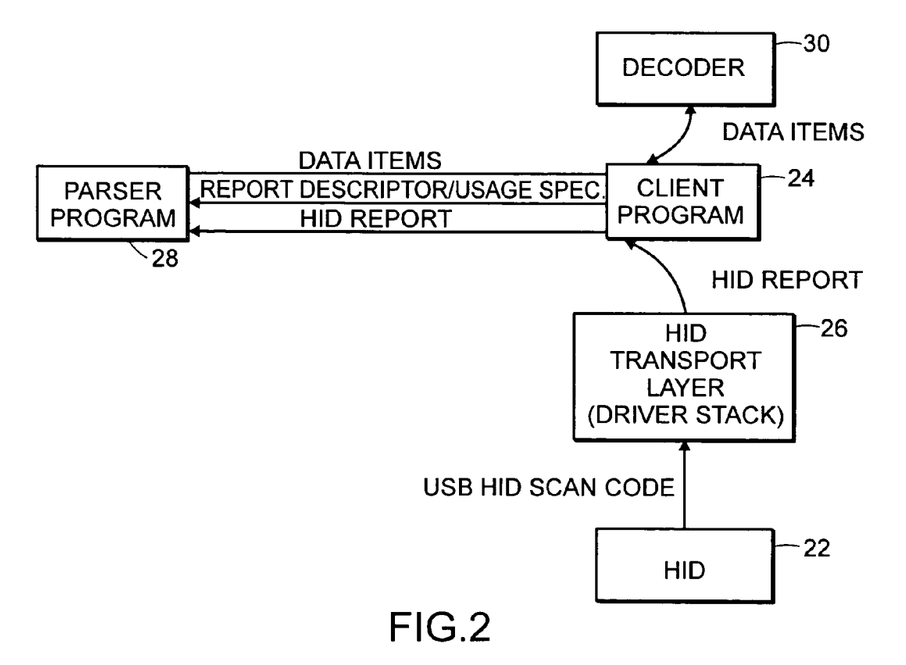
FIG. 2 is a block diagram of a HID data communication system for generating data items forwarded to a processing unit from a report using a report descriptor and a usage specification to parse the report into meaningful data items.

FIG. 2 illustrates components implemented within computer 10 and HID device 22 for providing communication between HID device 22 and client programs, such as client program 24 shown. Thus, while the term "HID device" means any device that communicates using HID reports with computer components via an HID protocol in its current or revised form, a client program is any program or program component, including operation system components, that is a consumer of HID data items.

A transport layer or driver stack 26 including one or more USB device drivers provides low-level communications with HID devices 22 in accordance with USB standards and protocols. An HID class driver 26 can be implemented on top of the transport layer, creating the functional device object which controls the physical device object enumerated by the transport layer (see OSI transport model). Driver stack 26 provides HID reports as well as HID report descriptors describing the HID reports. The HID reports described above are of different sizes and contain data items corresponding to control implemented in HID devices. The HID report descriptors specify the arrangement, formatting, and usage specifications of data items within the HID reports. For sake of brevity in the drawing, FIG. 2 illustrates what occurs after HID devices 22 receive the HID report descriptor, and a control occurs on the HID device to cause the generation of an HID report. Various HID scan codes can be placed at particular byte field locations within the HID report according to the descriptor.

Client program 24 can perform certain call routines that would allow the HID class driver or driver stack 26 to read HID reports and report descriptors from the HID devices 22, as well as other types of data provided by the HID devices. Upon receiving the HID report, client program 24 forwards the HID report to a parser program 28. Parser program 28 can be implemented by instructions that reside in the system memory, and that are executed by the processing unit. The interfaces and interface functions of an exemplary parser program 28 can be described in detail in the Windows NT® Design Guide available from Microsoft Corporation. Various functions of the parser program 28 callable by client program 24 include a descriptor parsing function, item retrieval function, and so forth.

The descriptor parsing function can receive function arguments that include the actual HID report descriptor and the usage specification from the system memory of the client program 24. In response thereto, parsing program 28 will parse the report descriptor and create a data structure containing a parsed report description. In general, the data structure is an expanded version of the raw report descriptor. The data structure is generally arranged as an array of data item descriptions. The data item description corresponding to a particular data item indicates in which report the data item is available, its position and size in the report, and its HID characteristics.

Armed with the HID report, the report descriptor, and usage specification, parser program 28 can produce the appropriate data items needed by the processing unit. Accordingly, the data items of interest are then forwarded to a decoder 30 within one or more functional blocks of processing unit 12 (see FIGS. 1 and 2). By decoding the data items, whatever controls are actuated upon the HID device 22 by a user will register within the processing unit for appropriate execution.

Figure 3:
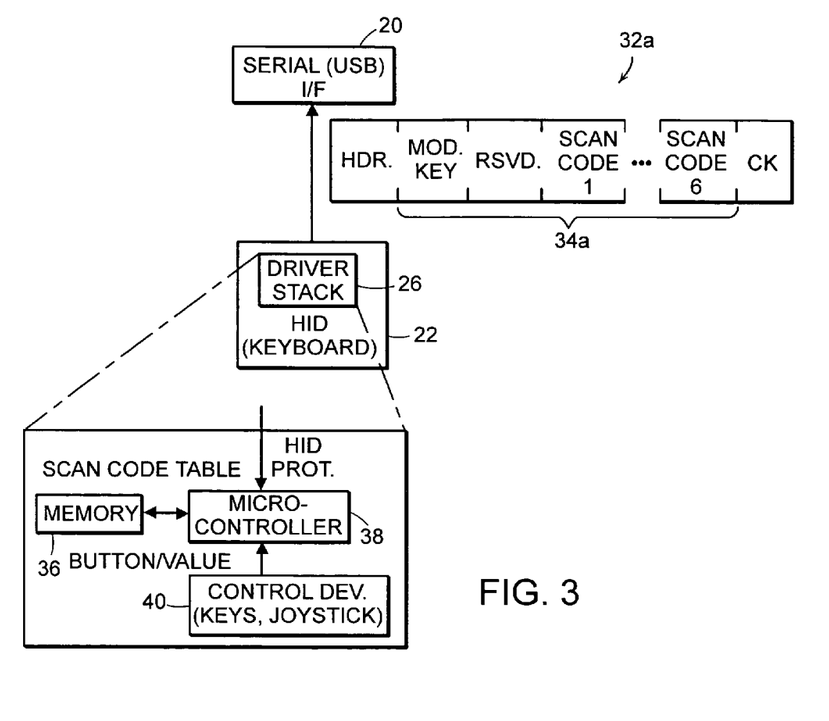
FIG. 3 is a block diagram of a report sent from a transport layer/driver stack of a keyboard to the serial interface, and the architecture for configuring the keyboard driver stack with scan codes and HID protocols.

FIG. 3 illustrates the format of an HID report 32a sent from the driver stack 26 within an HID keyboard 22. Report 32a is sent as a series of fields which can store bytes of information within a payload of a packet. The packet thereby includes a header (HDR), followed by a payload 34a, followed by a check sum (CK). The header can include certain identifier information, and the check sum can be coded to perform, for example, transmission error detection (i.e., parity checking) and possibly error correction. The payload 34a thereby contains the report. As shown, a typical HID keyboard report is formatted via an HID report descriptor as containing eight bytes, beginning with a modifier key byte, followed by a reserved byte, followed by a plurality of six scan code bytes. The modifier key is the shift, control, alt, etc. keys on the standard keyboard. The scan code are the various scan codes uniquely defining each key on a standard keyboard. As described herein, a standard keyboard is a QWERTY keyboard having approximately 101 keys. Available from Microsoft Corporation, and published on the Internet are the various scan codes assigned to each key of the QWERTY keyboard.

Along with the HID keyboard report 34a, the header and check sum information is sent as packet 32a to the USB port 20. Unfortunately, while report 34a allows simultaneous actuation of up to six keys, along with a modifier key, in most instances only one key will ever be depressed at a given time. Thus, report 34a reserves fields that, when not used, are simply packed with binary 0 values and nonetheless sent from the HID keyboard 22 to the USB port 20. If the transmission medium is wireless and the HID keyboard 22 is battery-powered, sending large numbers of binary 0 bytes is wasteful of battery charge.

In addition to illustrating the HID report 34a within packet 32a, FIG. 3 also illustrates what might occur prior to sending the report. In order for the HID device 22 to send a report which makes sense, the HID device 22 must also receive an HID descriptor that specifies the report byte locations. The HID report descriptor will list everything in the report and specify what the fields mean. The HID parser program thereby pulls the report and the descriptor to give meaning to the data items that are sent to the processing unit via the decoder. However, before receiving the data items in the decoder, the USB interface unit (oftentimes referred to as a "dongle") translates the data items into a standard USB format.

The HID keyboard 22 receives the descriptor via an HID protocol and also receives scan code information as to a particular hexadecimal code that will be produced whenever a unique key is depressed. That information can be stored inside the HID keyboard within a chipset available from, for example, Cypress Semiconductor Corporation. The chipset contains memory 36 and a microcontroller 38. The chipset or possibly a single integrated circuit embodied upon a microcontroller and memory scans the keyboard and reports the scan codes of unique keystrokes upon a control device 40 (i.e., keys, joystick, etc.) into the report format based on the report descriptor.

Figure 4:
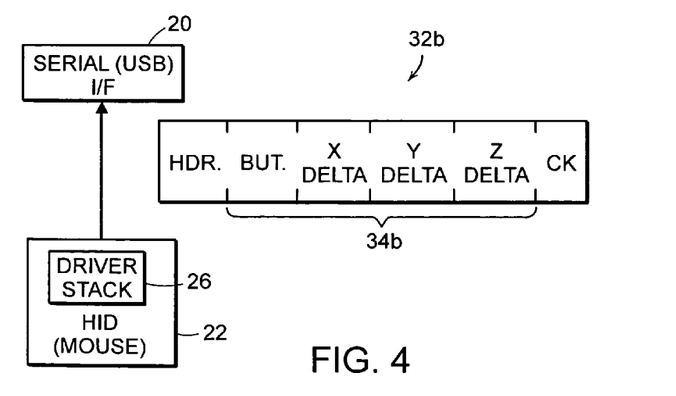
FIG. 4 is a block diagram of a report sent from a transport layer/driver stack of a mouse to the serial interface.

FIG. 4 illustrates another HID device 22, shown as an HID mouse. Driver stack 26 produces the appropriate HID report 34b embedded between a header (HDR) and check sum (CK) bytes of packet 32b. As shown, a typical HID mouse 22 will produce four bytes within four specific fields of packet 32b, where the first byte is reserved to indicate up to eight buttons being depressed concurrently on the mouse, the second byte indicates the displacement of the mouse relative to the graphical user interface screen (X DELTA), the third byte is reserved for the Y displacement (Y DELTA), and the last byte is reserved for the Z displacement, which is the displacement caused by movement of the scroll wheel on the mouse (Z DELTA). In most instances, a mouse pointing device might move, but no buttons are depressed and the scroll wheel is not moved. Unfortunately, however, if a report 34b is produced with the button byte filled in with 0 binary values, and the Z DELTA byte filled in with 0 binary values, an unduly large report will be sent across the wireless medium thereby deleteriously reducing charge in the battery-driven HID mouse 22.

The HID keyboard report 34a and the HID mouse report 34b must no longer be fixed in size to an 8-byte report and a 4-byte report, respectively, as shown in FIGS. 3 and 4. Instead, any unused fields should not be simply packed with binary 0 values to be transmitted across a wireless medium from a battery-driven HID device. Any unused fields or bytes that are unused are preferably be removed before being transmitted, so that only the essential fields or bytes within those fields are sent. In the operation of a wireless HID keyboard, the HID report is beneficially variable in size, and is reformatted and compressed from the report format 34a. Likewise, the operation of a wireless HID mouse transfers an HID report that is variable in size and compressed from that of report 34b.

The USB scan codes are stored in the keyboard and in the operation of a wireless HID keyboard, there could be five possible keyboard application reports. The reports are the standard QWERTY 101 keys report, the multimedia key report, the power key report, the keep alive report, and the battery voltage report. The reports are distinguished by the first application report byte to reduce the number of bytes required in the most common report (i.e., the standard 101 keys report). The first application report byte is the scan code 1 if that byte is less than 0xFC hexadecimal. Otherwise, the first application report byte is the report type (multimedia report type, power report type, battery report type, or stay alive report). This also assumes that multimedia and power keys do not utilize modifier keys and that 0xFF, 0xFE, 0xFD, and 0xFC are not valid standard 101 QWERTY key scan codes.

Packet headers starting with 0x7X require special handling. A packet header of 0x70 can be reserved as the "null" packet and indicates that all of the data bytes are 0 for the standard QWERTY 101 keys report. A packet header of 0x79 is the keep alive packet. Trailing 0's in the reports are removed to further minimize the number of bytes sent by the HID transmitter or radio. In one preferred embodiment, a wireless HID radio device sends the reports within the improved packet format (i.e., compressed packet format) having an application report sandwiched between the packet header and the check sum bytes. The application report is a compressed, variable-length HID report, where certain byte fields are swapped, unused byte fields are removed, and reserved byte fields that are not used are also removed prior to transmission. In other embodiments, packet headers and check sums may change as required by any particular protocol.

By taking advantage of the fact that there were no valid 101 QWERTY key scan codes that match 0xFF, 0xFE, 0xFD and 0xFC, such scan codes can be reserved to signify other activity. The standard 101 QWERTY keys report is formatted to optimize the assumption that the most common report will have only one non-zero scan code, and most likely no modifier keys will be depressed. The single non-zero scan code represents the scan code of the single key that has been depressed. Thus, common usage of the QWERTY 101 keypad involves depressing a single key in the most prevalent application. To take advantage of this application, the compressed application report format places the first scan code immediately after the header, followed by a modifier key if used, as shown in FIG. 5.

Figure 5:
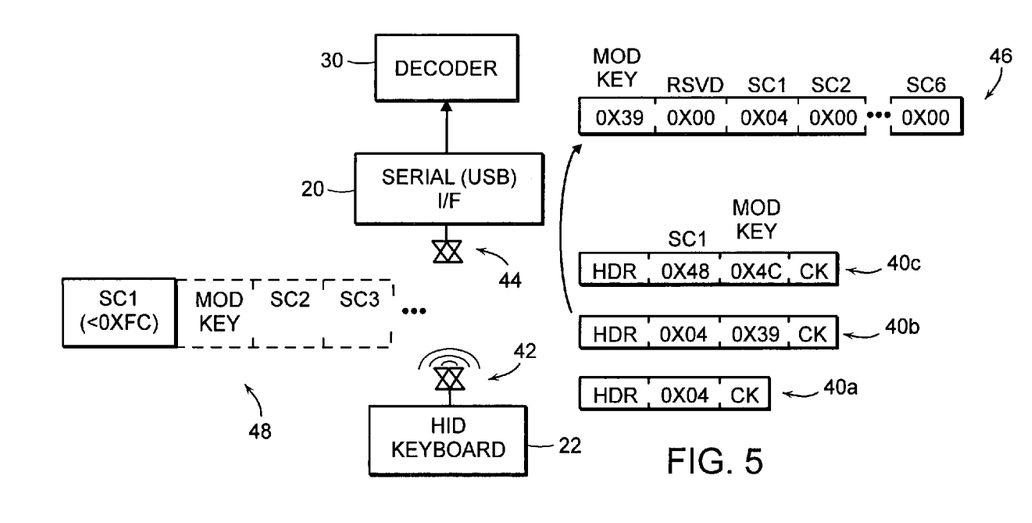
FIG. 5 is a block diagram of differing scan codes of three exemplary reports resulting from depressing various keys on the keyboard to form a specific byte sequence of compressed packets thereafter rearranged and appended (i.e., packed) with logic 0 values by the serial interface.

Turning now to FIG. 5, three different examples of a standard 101 QWERTY keys report 40a, 40b, and 40c are shown. For example, when a user depresses the "A" key on the HID keyboard 22, transmitter 42 will transmit packet 40a. Transmitter 42 will forward packet 40a across a wireless medium to receiver 44 that is electrically coupled via a wired medium to the USB interface or dongle 20. Stored within keyboard 22 are the various scan codes where "A" is represented as a hexadecimal 0x04. Instead of sending the modifier key byte field filled in with binary 0 values, the reserved byte field filled in with binary 0 values, and all scan codes subsequent to the first scan code filled in with binary 0 values, as in report 34a (FIG. 3), the only field sent in packet 40a is the first scan code representing the alphanumeric character "A" in this example.

However, if a user wishes to capitalize the "A" entry, the user may strike the "caps lock" key concurrent with striking the "A" key, thus, forcing the modifier key to send a hexadecimal 0x39 scan code subsequent to the first scan code sending the 0x04 representing the alphanumeric character "A," as shown by packet 40b. Still further, if the user wishes to strike possibly two modifier keys concurrently, the control key (represented as hexadecimal 0x48) and the delete key (represented as hexadecimal 0x4C) can be forwarded with packet 40c. In every instance, however, only those fields containing non-zero decimal values or fields populated with values that correspond to a depressed key, will be sent within a packet 40 across the wireless medium from transmitter 42.

Once the packet arrives within the USB dongle 20, the compressed packet can be rearranged back to its standard report format 46 (i.e., the boot protocol format recognizable to the PC BIOS. Using the example 40b report, the modifier key value 0x39 will be rearranged and placed in the first field, followed by a packed decimal value 0 in the next field (reserved field), followed by the first scan code of 0x04, followed by all remaining scan codes packed with 0 decimal values, as shown by report 46. By essentially reversing the compression routine, the compressed variable-length and shortened packet 40 that is transmitted across the wireless medium can be decompressed and modified back to a standard QWERTY 101 keys report format 46 that mimics format 34a (FIG. 3).

As shown by reference numeral 48, the standard 101 keys QWERTY keyboard compressed format begins by using the first scan code in the first field since the greatest likelihood is that only a single key (and not a modifier key) will be depressed. If any other keys are depressed, then those keys can be added to form the variable-length application report, as shown by dashed line in item 48. If the first field contains a byte less than 0xFC and if only one key is depressed, then only one byte will be sent within the report. However, if the first byte is possibly equal to or greater than 0xFC, then additional bytes will be needed as illustrated below.

Figure 6:
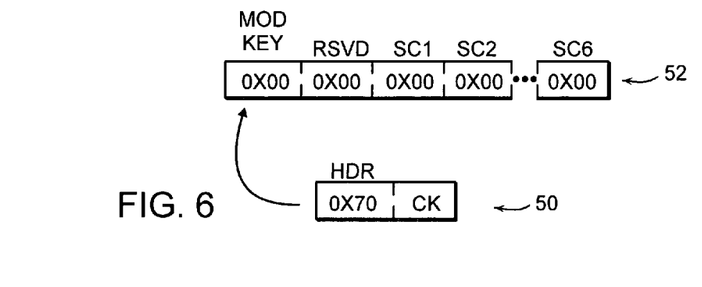
FIG. 6 is an exemplary report of an up key packet resulting from releasing a key on the keyboard.

While FIG. 5 illustrates the report that will be sent when a key is depressed, FIG. 6 illustrates a report generated when a key is released. When a key is released, an up key packet is sent from the HID keyboard to the dongle. The up key packet 50 is shown in FIG. 6, with the header (HDR) having a hexadecimal 0x70, for example, to indicate that all fields within the report will be packed with 0 logic values. The interface or dongle will then add the 0 values, beginning with the modifier key and ending with the last scan code. The dongle will also insert the reserved byte and remove the packet header to produce the USB packet 52. The dongle is essentially a bus bridge between the wireless HID device and the USB-enabled host or PC. The dongle communicates wirelessly with the keyboard and translates the data into USB packets to be sent to the USB host. The dongle will add the trailing 0's, insert the reserve byte, rearrange the modifier and "scan code 1" bytes, and remove the packet header and check sum to produce the USB packet 46 (FIG. 5) and 52 (FIG. 6), depending on whether the key is depressed or released, respectively.

Figure 7:
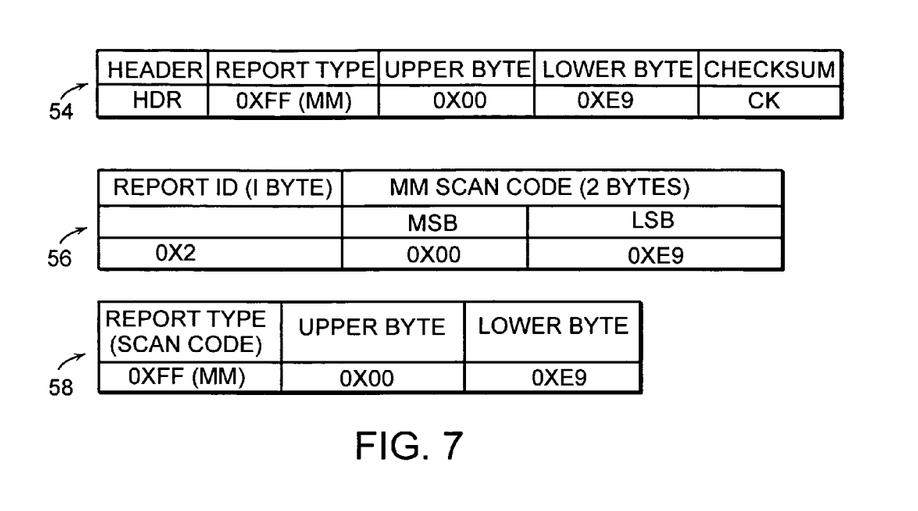
FIG. 7 is an exemplary report of a down key packet resulting from depressing various multimedia keys on the keyboard.

In a multimedia key (hot key) report, a report-type byte of 0xFF might be reserved to indicate that this report is a multimedia keys report. The multimedia keys report format is shown in FIG. 7. In an exemplary embodiment, if a user presses, for example, "volume increase" key on a multimedia keyboard, the multimedia keyboard having the "volume increase" functionality stamped on or near that particular key, would send the packet 54. It is noted that a multimedia keyboard will have additional keys beyond the QWERTY 101 keyboard, with certain keys reserved for various multimedia functions. Such functions include stop, play, pause, mute, bass, loudness, volume up, volume down, treble, media select, mail, calculator, www search, www home, www forward, etc. The multimedia functions allow audio and video communication and certain byte fields, either eight 1- or 2-byte fields can be used, as set forth in the Microsoft Corporation scan code translation table available off the Internet.

For example, if the volume up key is struck, then the first scan code will show hexadecimal 0xFF to indicate a multimedia-type report is being sent, and that the volume up key only requires 8 bits and, therefore, the most significant byte (MSB) of the multimedia scan code might be sent as a 0x00 while the least significant byte 0xE9 will be sent as the least significant byte (LSB) of the multimedia scan code. Alternatively, it may be desirable to further compress the multimedia packet 54 by sending only the first scan code (report type) and the least significant byte (byte) of the multimedia scan code since the most significant byte (MSB) of the multimedia scan code is not being used. However, if certain other scan codes that require two bytes are being sent, then both the MSB and LSB of the multimedia scan code can be sent.

Once received upon the dongle, the HID keyboard multimedia report 56 described during USB enumeration in the HID report descriptor might be produced by decompression report 54 and rearranging (or swapping) byte fields and packing binary 0's in unused byte positions, as described above.

The multimedia keyboard format 58 is shown to include a type designator in the first scan code position (SC1). That designator can be represented as a single byte unique to the indication of a multimedia keyboard (e.g., 0xFF). Subsequent bytes indicate possibly the status or value of that keyboard control key being actuated. By continuously depressing the "volume up" key, volume will increase at the speakers, for example.

Figure 8:
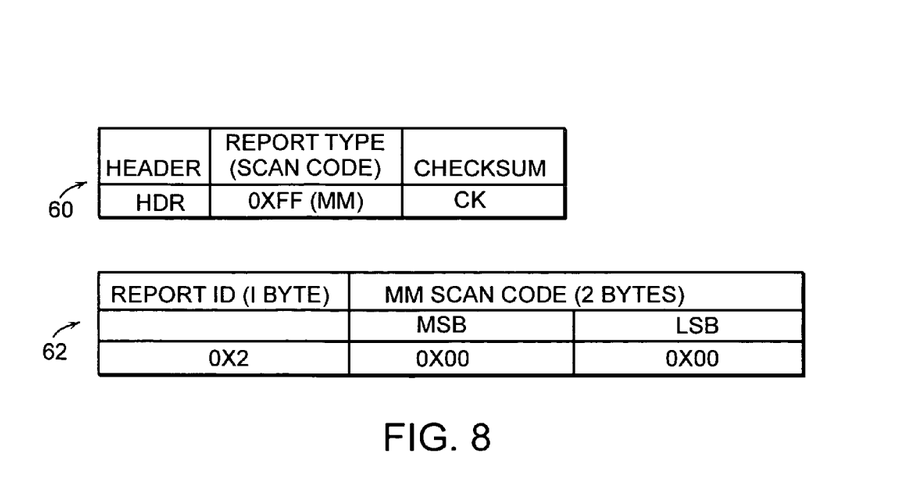
FIG. 8 is an exemplary report of an up key packet resulting from releasing a multimedia key on the keyboard.

FIG. 8 illustrates, contrary to FIG. 7, what would occur if the multimedia key is released. The first scan code of the up key packet 60 indicates that a multimedia key has been released by using the same byte value as that which designates a multimedia report type (i.e., 0xFF). At the dongle or USB interface, the compressed up key packet will be decompressed and bytes will be rearranged back to the HID report format, as shown by reference numeral 62.

Figure 9:
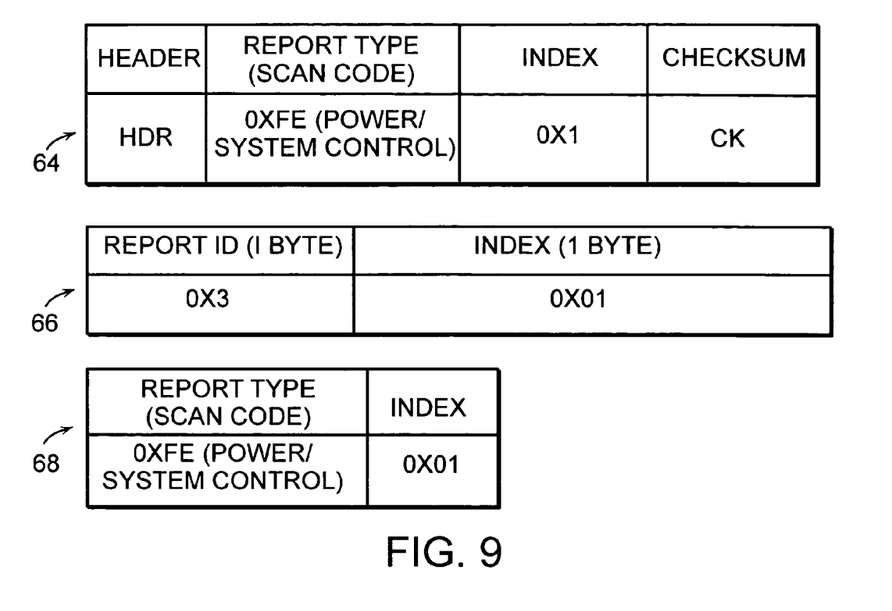
FIG. 9 is an exemplary report of a down key packet resulting from depressing various power keys on the keyboard.
Figure 10:
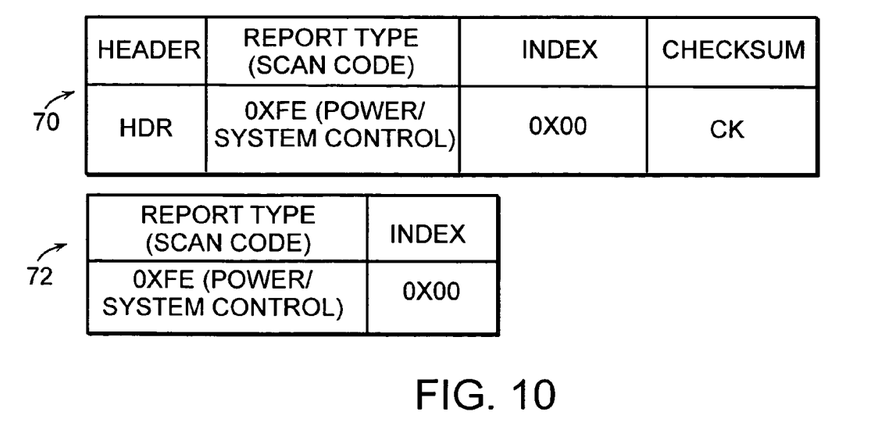
FIG. 10 is an exemplary report of an up key packet resulting from releasing a power key on the keyboard.

FIG. 9 illustrates the format of a packet 64 if a power key (e.g., sleep key) is depressed. The sleep key can be coded with a scan code of 0x82 and placed in the second scan code field position (scan code 2, or "SC2"). The HID report descriptor can also be defined to allow an index or bit value to indicate which power or system control key. For instances a 0x1 could indicate the sleep key scan code of 0x82. To designate packet 64 as containing a power key report type, the first scan code field position (SC1) contains a code unique to a power key report (0xFE). The power keys, similar to multimedia keys, are shown on the face of the keyboard and include keys used to place the PC in various states of activity. For example, there may be power keys designated to force the PC in a wake-up condition, a sleep condition, or a suspend condition. Thus, in the example shown, if a user presses the sleep key on the keyboard, packet 64 would be sent from the HID keyboard, and the HID keyboard power (system control) report format described during USB enumeration in the HID report descriptor will be recompiled at the interface or dongle as shown by packet 66. The power key report is of variable size, with a designator in the first scan code position to indicate a power key has been depressed, followed by subsequent one or more scan codes indicating which power key has been depressed, as shown by the power key report 68. FIG. 10 illustrates report 70 resulting from releasing the power key (e.g., sleep, wake-up, suspend, etc.). Upon receiving the up key packet 70 at the dongle, report 72 is generated.

Figure 11:
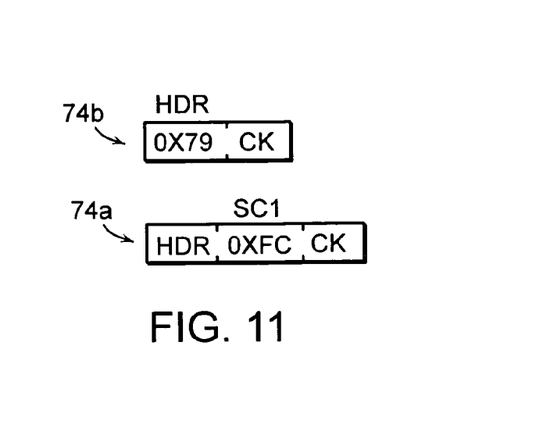
FIG. 11 is an exemplary report of keep alive packet resulting from maintaining actuation of an input device, such as maintaining the depression of a key on a keyboard.

FIG. 11 illustrates two forms of a keep alive report, shown as packets 74a and 74b. The purpose of a keep alive report is to indicate that the previously depressed key continuously gets sent from the keyboard to the PC if that key remains depressed and communication between the keyboard and the PC is not lost. Thus, for example, if the user is holding down the "L" key, the keep alive report contained within packet 74a or 74b is sent periodically to tell the dongle that the input is still alive, and that the user is holding down the "L" key. For example, the "L" key will string together as a sequence of "L" on, for example, the monitor until either the user stops depressing the "L" key or the keyboard loses communication with the PC. If either of these circumstances occurs, then the dongle will automatically generate an up key report so that "L" is not kept on.

To signify the keep alive report, either a particular byte unique to the keep alive report type can be placed in the first scan code position of the report (e.g., 0xFC) as shown by packet 74a, or a single byte can be placed in the header of packet 74b without any report embedded between the header and the check sum byte. It might be more reliable to use the byte designator in the first scan code position of the report (i.e., 0xFC) if there is communication with both a pointing device and a keyboard at the same time. By placing a unique byte designator for a keep alive within a keep alive report instead of generically within a header of a packet not containing any report, the PC would know to continue receiving a depressed key while also receiving movement of the pointer device. Thus, indicating a keep alive specific to a particular report type will ensure that only that report type will be kept alive, with possibly other report types discontinued or vice-versa to prevent conflicts that might occur if a keep alive is maintained only in the header of a packet that has not been designated to a particular report type. If the interface or dongle does not receive a keep alive packet 74a or 74b, or an up key report within a specified interval while a down key is present, the dongle will generate an up key report to the processing unit or PC.

Figure 12:
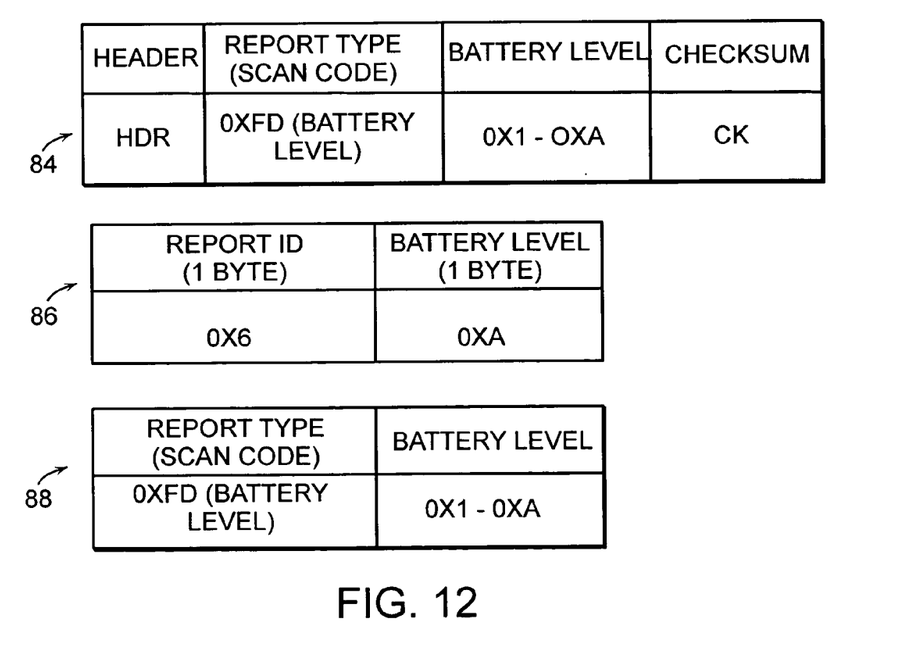
FIG. 12 is an exemplary report of a battery status or condition of the keyboard resulting periodically sending a battery status report from the keyboard.

FIG. 12 illustrates a battery voltage report packet 84. A single byte placed in the first scan code position designates the report as a battery voltage report type (i.e., 0xFD). In the next scan code position, a byte is reserved to designate a voltage range from, for example, 1-10 as shown. The low voltage range of 1 is a low voltage value, and a high voltage range of 10 is a full voltage value. Thus, the byte within the second scan code position (SC2) can range anywhere from 0x01-0x0A. The battery voltage report within packet 84 can be sent at any time. In one exemplary embodiment, a battery voltage report within packet 84 with fully charged batteries is designated with a hexadecimal value 0x0A, and battery voltage report within packet 84 with low batteries is shown as 0x01, for example. The report within packet 84 is recompiled in uncompressed format at the dongle, as shown by packet 86 which was defined by the HID report descriptor during enumeration. The format used by the battery voltage report is shown by reference numeral 88, with variable numbers of fields appended at the end of the first scan code designating the report 88 as a battery voltage report (e.g., 0xFD).

Figure 13:
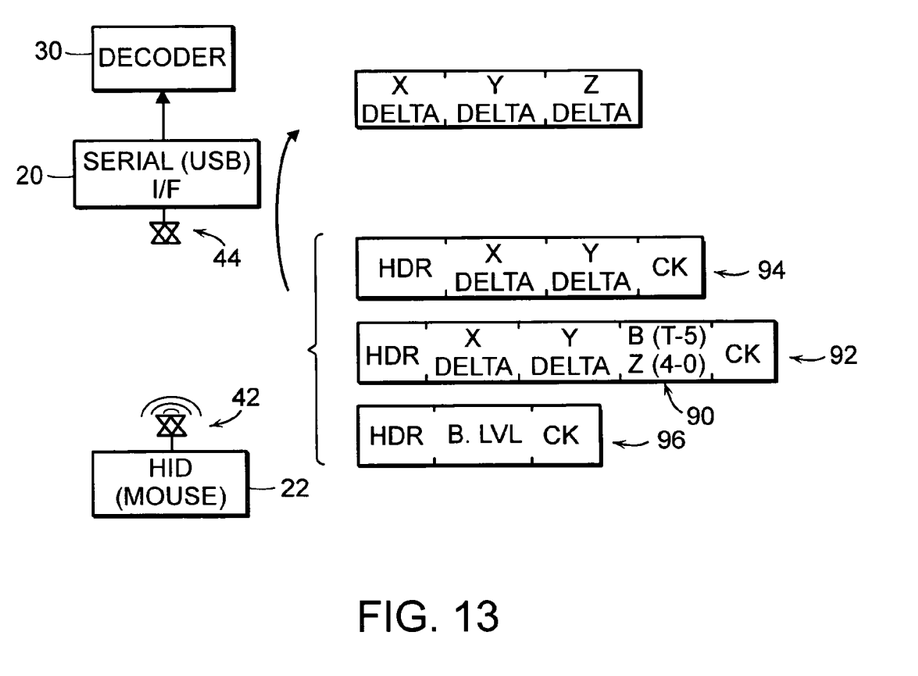
FIG. 13 a block diagram of differing scan codes of three exemplary reports resulting from depressing various buttons on a mouse to form a specific byte sequence of compressed packets thereafter rearranged and appended (i.e., packed) with logic 0 values by the serial interface.

There are a variety of mouse report formats that can be used. The mouse protocol has been optimized to reduce the "on-time" of the transmitter radio associated with the mouse or pointer device. This equates to reduced power consumption, where optimization is available for a 3-button pointing device. It is possible to combine the Z DELTA or Z displacement and the button report into a single byte field, allowing five bits of information for the Z DELTA (bits 4-0) and three bits for the 3-button bits 7-5, as shown by field 90 within one format of the mouse report packet 92. Since mouse usage data demonstrates that the X and Y DELTA or displacement is more frequent than the Z DELTA (scroll movement), it is desirable to possibly send packet 94 in most instances.

Thus, if only the mouse is moved and the scroll wheel or other button are not touched or depressed, packet 94 can be sent containing only two byte fields within the mouse report. Thus, packet 94 shows what occurs when only the mouse if moved. Packet 92 shows not only the displacement of a cursor on a screen relative to the previous displacement, but also which button (amongst three buttons) on the mouse is depressed, and the position of the scroll wheel movement. In the case where there is no X or Y DELTA data, but there is a Z DELTA or button data, then the X and Y DELTA byte fields will be set to 0. The Z DELTA is a signed value with bit position 4 as the signed bit (0 based bit numbering). When a button is held down, this packet format may continue to be sent at the poll rate until the button is released. This is so the bridge or dongle can generate a button up event if the connection is lost. When a button is released, and there is no mouse movement, a two byte packet is sent, with X and Y set to zero to indicate a button up event. A third packet format 96 is shown to indicate the battery voltage level communicated from the pointer device. The battery voltage level (B. LVL) can be transmitted within a single byte, and similar to the keyboard battery voltage level, can be transmitted periodically such as every X number of sent reports.

Advantages of the improved packet compression include that it significantly reduces the amount of data that must be transmitted over the wireless link from the wireless HID device without removing necessary information. This significantly increases the battery life of the HID device that is very attractive to customers and users. For purposes of clarity, many of the details and the methods of designing and manufacturing the HID device, USB link between the HID device and the PC, as well as the PC are generally known and are readily appreciated to those skilled in art having the benefit of this disclosure.

It is to be understood that the forms of the invention shown and described herein are to be taken as the presently preferred embodiments. Differing circuits, electronic subsystems, protocols, programs, and processes may be substituted for those illustrated and described herein, circuit input/output and processes may be reversed, and certain features of the invention may be utilized independently, all as would be apparent to one skilled in the art after having the benefit of this disclosure. Changes may be made in the elements described herein without departing from the spirit and scope of the invention as described in the following claims.

What is claimed is:

1. A method of reducing power consumption in a wireless device, comprising:
    prior to forwarding to a target destination device, modifying a packet having a predetermined payload capacity, by
    removing any bytes from the packet that are not to be used by the destination device
    removing any reserved bytes from the packet;
    swapping a byte within one field of the packet with a byte within another field of the packet;
    thereby creating a modified packet having a payload that is less than the payload capacity and
    forwarding the modified packet from the wireless device across a wireless medium to the destination device, wherein a sequence of said bytes within the packet comprise data items within a human interface device (HID) report.

2. The method as recited in claim 1, wherein the bytes removed from the packet are those having a 0 decimal value.

3. The method as recited in claim 1, wherein the bytes removed from the packet are those reserved for a key or button on the wireless device that was not depressed.

4. The method as recited in claim 1, wherein the wireless device is an input device and the destination device is a computer.

5. The method as recited in claim 1, wherein some of the bytes represent scan codes stored in the device that uniquely represent a human actuation of a control upon the device comprising a button, a key, a slider, a knob, a trackball, a switch, or a joystick.

6. The method as recited in claim 1, further comprising, after said forwarding, adding back the removed unused bytes, adding back the reserved bytes, and reversing the swapped bytes to reconstruct the packet.

7. A system for compressing a packet of data, comprising:
    an input device configured to produce a human interface device (HID) report within the packet;
    the HID report having a predetermined data capacity;
    a device driver coupled to receive the HID report, re-order the ordered sequence of bytes remove bytes within the ordered sequence of bytes that are not generated by user-actuation of the input device, and swap a byte within one field of the packet with a byte within another field of the packet to form a compressed packet of data; and
    a wireless medium configured to allow the compressed packet of data to be sent to the destination device.

8. The system as recited in claim 7, wherein the input device is selected from the group consisting of a keyboard and a mouse, and wherein the keyboard is configured to produce the HID report of a first predefined number of bytes, and the mouse is configured to produce the HID report of a second predefined number of bytes less than the first predefined number of bytes, and the compressed packet of data contains a third predefined number of bytes less than the first predefined number of bytes if the input device is a keyboard, and the compressed packet of data contains a fourth predefined number of bytes less than the second predefined number of bytes if the input device is a mouse.

9. The system as recited in claim 7, wherein the input device comprises a battery that discharges less when the compressed packet of data is sent across the wireless medium than if the packet of data is sent across the wireless medium.

10. The system as recited in claim 7, wherein the input device comprises a transmitter that consumes less power when transmitting the compressed packet of data across the wireless medium than if the packet of data is transmitted across the wireless medium.

11. The system as recited in claim 7, wherein the compressed packet of data comprises a first byte within the reordered plurality of scan code bytes having a value indicating whether a keyboard key, multimedia key, or power key is actuated upon the input device.

12. The system as recited in claim 11, wherein the value being less than hexadecimal binary value 0xFC indicates a keyboard key is actuated.

13. The system as recited in claim 11, wherein a second byte immediately subsequent to the first byte having a second value indicating a multimedia, power, or battery status.

14. The system as recited in claim 7, wherein the compressed packet of data comprises a single byte having a value indicating whether a keyboard key, a multimedia key, or a power key upon the input device is user de-actuated.

15. The system as recited in claim 14, wherein the single byte occurs immediately after a header within the compressed packet of data.

16. The system as recited in claim 7, wherein the compressed packet of data comprises a single byte having a value indicating whether a previous user-actuation upon the input device is kept alive.

17. A computer-readable storage medium, comprising:
    computer-executable instructions that define a sequence of call routines to:
    extract a human interface device (HID) report containing a pre-defined sequence of bytes within a packet of data having a predetermined data capacity and remove any bytes within the packet of data having a 0 decimal value whenever an input device is user-actuated;
    extract a single byte having a value indicating all subsequent bytes within the packet of data have a 0 decimal value whenever the input device is user-deactivated, and
    swap an individual byte within one field of the packet with another individual byte within another field of the packet.

18. The computer-readable storage medium as recited in claim 17, wherein the instructions define a further call routine to extract a first byte having a type value indicating whether a key on the input device is user-actuated.

19. The computer-readable storage medium as recited in claim 18, wherein the instructions define yet another further call routine to extract a second byte and place the second byte immediately subsequent to the first byte, and having a value indicating a multimedia value or a battery status value.

* * * * *